United States Patent
Karjalainen et al.

(10) Patent No.: US 10,862,563 B2
(45) Date of Patent: Dec. 8, 2020

(54) REFERENCE SIGNAL WITH BEAMFORMING TRAINING AND CHANNEL ESTIMATION

(71) Applicant: Nokia Technologies Oy, Espoo (FI)

(72) Inventors: Juha Pekka Karjalainen, Oulu (FI); Mihai Enescu, Espoo (FI); Kari Pekka Pajukoski, Oulu (FI); Sami-Jukka Hakola, Kempele (FI); Timo Koskela, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/332,821

(22) PCT Filed: Aug. 14, 2017

(86) PCT No.: PCT/FI2017/050572
§ 371 (c)(1),
(2) Date: Mar. 13, 2019

(87) PCT Pub. No.: WO2018/065662
PCT Pub. Date: Apr. 12, 2018

(65) Prior Publication Data
US 2019/0363777 A1 Nov. 28, 2019

Related U.S. Application Data
(60) Provisional application No. 62/403,522, filed on Oct. 3, 2016.

(51) Int. Cl.
*H04B 7/06* (2006.01)
*H04L 5/00* (2006.01)
*H04W 16/28* (2009.01)

(52) U.S. Cl.
CPC ......... *H04B 7/0695* (2013.01); *H04B 7/0617* (2013.01); *H04B 7/0626* (2013.01);
(Continued)

(58) Field of Classification Search
CPC .. H04B 7/0695; H04B 7/0617; H04B 7/0626; H04L 5/0051; H04L 5/0094; H04W 16/28
See application file for complete search history.

(56) References Cited

U.S. PATENT DOCUMENTS

| | | |
|---|---|---|
| 8,644,184 B1 | 2/2014 | Zhang et al. |
| 2014/0146863 A1 | 5/2014 | Seol et al. |

(Continued)

FOREIGN PATENT DOCUMENTS

| | | |
|---|---|---|
| EP | 2383928 A2 | 11/2011 |
| EP | 3068060 A1 | 9/2016 |

(Continued)

OTHER PUBLICATIONS

"Verizon 5G TF; Air Interface Working Group; Verizon 5th Generation Radio Access; Physical channels and modulation (Release 1)", Verizon, TS V5G.211, V1.3 , Jun. 2016, pp. 1-79.

(Continued)

*Primary Examiner* — Duc C Ho
(74) *Attorney, Agent, or Firm* — Squire Patton Boggs (US) LLP (57) ABSTRACT

Various communication systems may benefit from improved signaling. For example, communication systems may benefit from sending a multi-numerology reference signal that allows a receiving user equipment to perform simultaneous beamforming training, and channel estimation or channel state information acquisition. A method may include receiving at a user equipment a multi-numerology joint reference signal (610). The reference signal may include a reference signal for data channel demodulation or channel state infor- (Continued)

mation acquisition, and beamforming training. The method may also include performing simultaneous beamforming training and channel estimation or channel state information acquisition based on the multi-numerology joint reference signal (620).

19 Claims, 7 Drawing Sheets

(52) U.S. Cl.
CPC .......... *H04L 5/0051* (2013.01); *H04L 5/0094* (2013.01); *H04W 16/28* (2013.01)

(56) References Cited

U.S. PATENT DOCUMENTS

| | | | |
|---|---|---|---|
| 2015/0304007 | A1 | 10/2015 | Chu et al. |
| 2016/0043781 | A1 | 2/2016 | Cho et al. |
| 2016/0044711 | A1 | 2/2016 | Lou et al. |
| 2016/0080051 | A1* | 3/2016 | Sajadieh ................. H04W 4/70 375/267 |
| 2016/0255606 | A1 | 9/2016 | Chu et al. |
| 2016/0285660 | A1 | 9/2016 | Frenne et al. |
| 2017/0181132 | A1* | 6/2017 | Xiao ................... H04B 7/0456 |
| 2018/0139014 | A1* | 5/2018 | Xiong ................... H04L 1/1861 |
| 2019/0013848 | A1* | 1/2019 | Xiong ................. H04L 27/2607 |
| 2019/0229789 | A1* | 7/2019 | Zhang ................. H04B 7/0617 |
| 2020/0067615 | A1* | 2/2020 | Ghanbarinejad .... H04B 7/0408 |

FOREIGN PATENT DOCUMENTS

| | | |
|---|---|---|
| JP | 2016506112 A | 2/2016 |
| JP | 2016510197 A | 4/2016 |
| WO | 2014/074894 A1 | 5/2014 |
| WO | 2014/139174 A1 | 9/2014 |
| WO | 2015/141065 A1 | 9/2015 |
| WO | 2018/061088 A1 | 4/2018 |

OTHER PUBLICATIONS

"Discussion on UI Beam Management in Multi-Beam Operation", 3GPP TSG-RAN Working Group 1 meeting #86, R1-167128, Agenda: 8.1.5, Intel Corporation, Aug. 22-26, 2016, pp. 1-7.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.2.0, Jun. 2016, pp. 1-623.

"3rd Generation Partnership Project; Technical Specification Group Radio Access Network; Evolved Universal Terrestrial Radio Access (E-UTRA); Physical layer procedures (Release 13)", 3GPP TS 36.213, V13.2.0, Jun. 2016, pp. 1-381.

"UE Specific Beamforming with Aperiodic CSI-RS Transmission", 3GPP TSG-RAN Working Group 1 meeting #86, R1-167637, Agenda: 7.2.4.1.2, Ericsson, Aug. 22-26, 2016, pp. 1-6.

International Search Report and Written Opinion received for corresponding Patent Cooperation Treaty Application No. PCT/FI2017/050572, dated Nov. 20, 2017, 16 pages.

Extended European Search Report received for corresponding European Patent Application No. 17857890.2, dated Apr. 28, 2020, 20 pages.

"Design of Beam Training", 3GPP TSG RAN WG1 Meeting #86bis, R1-1608774, Agenda: 8.1.4.1, CATT, Oct. 10-14, 2016, 6 pages.

Office action received for corresponding Japanese Patent Application No. 2019-510343, dated Jan. 8, 2020, 4 pages of office action and 2 pages of translation available.

"Reference Signal Design for NR MIMO", 3GPP TSG-RAN WG1 meeting #86, R1-166213, Agenda: 8.1.5, ZTE Corporation, Aug. 22-26, 2016, 6 pages.

Office action received for corresponding Korean Patent Application No. 2019-7012765, dated May 13, 2020, 6 pages of office action and 4 pages of translation available.

Japanese Office Action corresponding to JP Application No. 2019-510343, dated Jul. 8, 2020.

\* cited by examiner

REFERENCE SIGNAL WITH BEAMFORMING TRAINING AND CHANNEL ESTIMATION

RELATED APPLICATION

This application was originally filed as PCT Application No. PCT/FI2017/050572 on Aug. 14, 2017, which claims priority from U.S. Application No. 62/403,522 filed on Oct. 3, 2016.

BACKGROUND

Field

The described invention relates to wireless communications, and more particularly to a reference signal for 5G New Radio systems.

Description of the Related Art

Third generation partnership project (3GPP) $5^{th}$ generation (5G) technology is a new generation of radio systems and network architecture that can deliver extreme broadband and ultra-robust, low latency connectivity. 5G can provide for a digital-analog hybrid antenna architecture used at a base station and a user equipment. The hybrid antenna can help to facilitate system targeting for higher carrier frequencies that are greater than 6 gigahertz (GHz).

Higher carrier frequencies, such as 28 GHz, may lead to large propagation and/or path loss of a radio channel. To achieve sufficient coverage in such a cellular network involving such higher carrier frequencies, beamforming via large scale antenna arrays may be used. Large scale antenna arrays will increase the antenna gain of the network, the base station, for example, having an increase of 18 decibel (dB) with 64 antenna elements, while the user equipment has a 9 dB increase with 8 antenna elements.

In order to exploit the full merit of the large scale antenna arrays, phased antenna array technology may be used. Directivity at the transmitter and receiver may also be adjusted according to a deployment scenario and/or potential changes in the radio link between the transmitter and receiver are also be made. Using such methods to exploit the full merit of the arrays, however, may lead to a large amount of system overhead caused by performing functions such as beamforming training, beam tracking, and beam switching at a user equipment.

SUMMARY

According to certain embodiments, an apparatus may include at least one memory including computer program code, and at least one processor. The at least one memory and the computer program code may be configured, with the at least one processor, to cause the apparatus at least to receive at a user equipment a multi-numerology joint reference signal. The reference signal comprises a reference signal for data channel demodulation or channel state information acquisition, and a reference signal for beamforming training. The at least one memory and the computer program code may also be configured, with the at least one processor, to cause the apparatus at least to perform simultaneous beamforming training and channel estimation or channel state information acquisition based on the multi-numerology joint reference signal.

A method, in certain embodiments, may include receiving at a user equipment a multi-numerology joint reference signal. The reference signal may comprise a reference signal for data channel demodulation or channel state information acquisition, and a reference signal for beamforming training. The method may also include performing simultaneous beamforming training and channel estimation or channel state information acquisition based on the multi-numerology joint reference signal.

An apparatus, in certain embodiments, may include means for receiving at a user equipment a multi-numerology joint reference signal. The reference signal may comprise a reference signal for data channel demodulation or channel state information acquisition, and a reference signal for beamforming training. The apparatus may also include means for performing simultaneous beamforming training and channel estimation or channel state information acquisition based on the multi-numerology joint reference signal.

According to certain embodiments, a non-transitory computer-readable medium encoding instructions that, when executed in hardware, perform a process. The process may include receiving at a user equipment a multi-numerology joint reference signal. The reference signal may comprise a reference signal for data channel demodulation or channel state information acquisition, and a reference signal for beamforming training. The process may also include performing simultaneous beamforming training and channel estimation or channel state information acquisition based on the multi-numerology joint reference signal.

According to certain other embodiments, a computer program product may encode instructions for performing a process. The process may include receiving at a user equipment a multi-numerology joint reference signal. The reference signal may comprise a reference signal for data channel demodulation or channel state information acquisition, and a reference signal for beamforming training. The process may also include performing simultaneous beamforming training and channel estimation or channel state information acquisition based on the multi-numerology joint reference signal.

According to certain embodiments, an apparatus may include at least one memory including computer program code, and at least one processor. The at least one memory and the computer program code may be configured, with the at least one processor, to cause the apparatus at least to prepare at the network node a multi-numerology joint reference signal. The reference signal may comprise a reference signal for data channel demodulation or channel state information acquisition, and a reference signal for beamforming training. The at least one memory and the computer program code may also be configured, with the at least one processor, to cause the apparatus at least to send the multi-numerology joint reference signal to a user equipment.

A method, in certain embodiments, may include preparing at the network node a multi-numerology joint reference signal. The reference signal may comprise a reference signal for data channel demodulation or channel state information acquisition, and a reference signal for beamforming training. The method may also include sending the multi-numerology joint reference signal to a user equipment.

An apparatus, in certain embodiments, may include means for preparing at the network node a multi-numerology joint reference signal. The reference signal may comprise a reference signal for data channel demodulation or channel state information acquisition, and a reference signal for beamforming training. The apparatus may also include means for sending the multi-numerology joint reference signal to a user equipment.

According to certain embodiments, a non-transitory computer-readable medium encoding instructions that, when executed in hardware, perform a process. The process may include preparing at the network node a multi-numerology joint reference signal. The reference signal may comprise a reference signal for data channel demodulation or channel state information acquisition, and a reference signal for beamforming training. The process may also include sending the multi-numerology joint reference signal to a user equipment.

According to certain other embodiments, a computer program product may encode instructions for performing a process. The process may include preparing at the network node a multi-numerology joint reference signal. The reference signal may comprise a reference signal for data channel demodulation or channel state information acquisition, and a reference signal for beamforming training. The process may also include sending the multi-numerology joint reference signal to a user equipment.

BRIEF DESCRIPTION OF THE DRAWINGS

For proper understanding of the invention, reference should be made to the accompanying drawings, wherein.

DETAILED DESCRIPTION

Certain embodiments may provide for simultaneous transmitter (Tx)/receiver (Rx) beamforming training and channel estimation for a demodulation of data channels. A channel estimation, for example, may be an estimation of the reference signal received power (RSRP), reference signal received quality (RSRQ), or channel state information (CSI) of downlink (DL) physical data channel demodulation. In certain embodiments, the DL CSI may be a rank indicator (RI), a precoder matrix indicator (PMI), or channel quality information (CQI).

In some embodiments, a user equipment (UE) may receive a joint multi-numerology reference signal for data channel demodulation and UE TX/RX beamformer training, while in other embodiments, a UE may receive a joint multi-numerology reference signal for DL CSI acquisition and UE TX/RX beamformer training. The reference signal may employ frequency-division multiplexing (FDM) or orthogonal frequency-division multiplexing (OFDM). A UE receiving the joint multi-numerology reference signal may simultaneously receive the reference signal and perform beamforming training, as well as determine a channel estimation or acquire CSI. The reference signal may therefore be a multi-purpose reference signal, allowing the UE to perform beamforming training and a channel estimation or CSI acquisition simultaneously.

Figure 1:
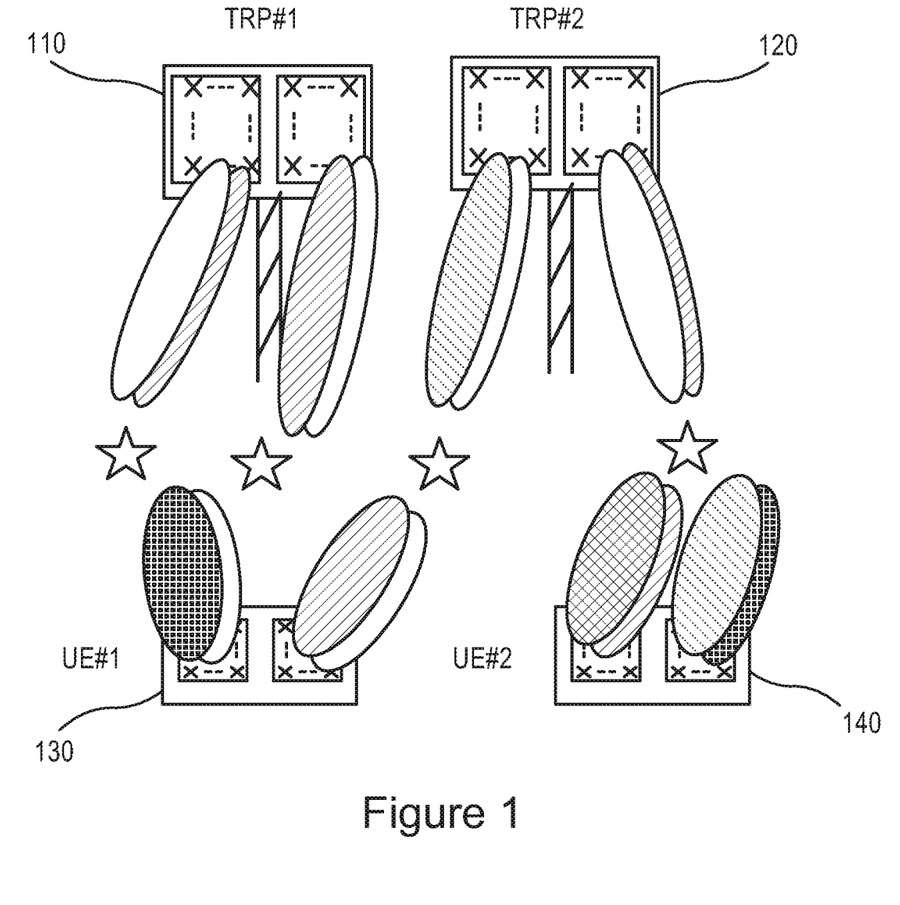
FIG. 1 illustrates a system according to certain embodiments.

FIG. 1 illustrates a system according to certain embodiments. Specifically, FIG. 1 illustrates an example of a simplified multi-beam communication system having two transmission/reception points (TRPs) 110, 120 and two UEs 130, 140. Each UE 130, 140 may contain at least one receiver that receives a signal from at least one transmitter in TRPs 110, 120. Together, the receiver and the transmitter may form a Tx/Rx beam pair. In the embodiments of FIG. 1, multiple transmitter and receiver beam pairs may be identified and separately trained in order to exploit the full merit of Tx and Rx beamforming. Such separate training may impose high signaling overhead and latency. Signaling overhead will increase to an even greater amount when the beamforming training is performed on an on demand basis for each UE.

Certain embodiments may enhance a communication system that utilizes beamforming by reducing the increased signaling overhead associated with beamforming functions. A joint multi-numerology reference signal may be introduced to help perform efficient beamforming training and tracking, while also reducing the system overhead and latency.

The joint multi-numerology reference signal may be sent from a network node, such as a 5G NodeB (5G NB) or a base station, to a UE. The UE may then simultaneously perform Tx/Rx beamforming training, as well as a channel estimation of the data channel or CSI acquisition. In other words, the UE may perform RX/TX beamforming training while receiving the reference signal from the network node. In some embodiments, the reception of the reference signal at the UE may depend on the number of resources which are dedicated or available for the reception of the beam. The reference signal may have varying patterns and numerology options in different embodiments.

A network node may prepare or construct a multi-numerology reference signal. A multi-numerology reference signal, for example, may include a reference signal in which multiple signal characteristics are defined within the same signal, such as symbol duration, sub-carrier spacing, and the number of symbols per subframe. The reference signal may be used by the UE for data channel demodulation or CSI acquisition, and for Tx/Rx beamforming training. Beamforming training may include the UE choosing the best beam direction in an azimuth and/or an elevation domain that gives the highest channel gain between the receiver at the UE and the transmitter at the network node from which the beam is received. At least one Tx/Rx or antenna in the UE or the network node may then be adjusted or changed in accordance with the best beam direction to achieve the higher gain. This can help to ensure the quality of a beam pair communication link between the user equipment and the network node. In addition to the reference signal including a beamforming training pattern, the reference signal may also include beam measurements, e.g. RSRP or RSRQ, or any other form of data.

In certain embodiments, the reference signal may be configured or constructed from physical resource blocks associated with multiple OFDM symbols having different time durations. Each physical resource block may be defined by a set of frequency resources which may be further divided into physical resource elements. Frequency resources within each block can be associated with at least one antenna port. The number of antenna ports, and the association of the antenna ports to physical resources, may be dynamically configured, for example, via dedicated user-specific downlink control signaling. A physical resource block may have a single numerology or multiple numerologies. In some embodiments, each physical resource block may either have the same or a different reference signal pattern.

Figure 4A:
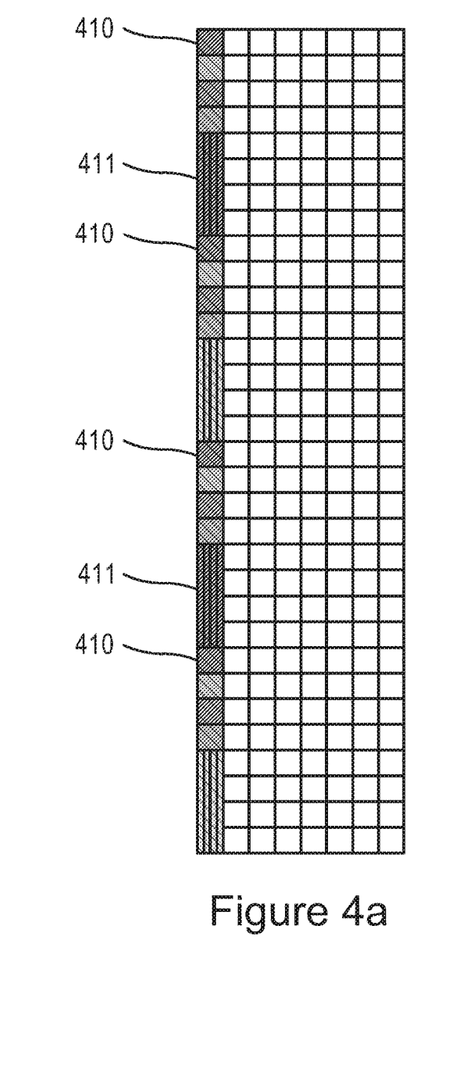
FIG. 4a illustrates a reference signal pattern according to certain embodiments.

The antenna ports associated with physical resource blocks can, in certain embodiments, be multiplexed with each other in a frequency domain, code, and/or time-domain. Multiple multi-numerology reference signals for data channel demodulation may be transmitted over at least two consecutive OFDM symbols, as shown in FIG. 4a, having either the same or different symbol time durations. In other embodiments, however, the multiple multi-numerology reference signals may be transmitted using any pattern of OFDM symbols.

In certain embodiments, a network node may transmit a multi-numerology reference signal for data channel demodulation or CSI acquisition. The UE may then simultaneously perform beamforming training and a channel estimation for data channel demodulation, such as a physical downlink channel, or DL CSI acquisition. Before receiving the reference signal, the UE may receive information about the reference signal type and/or associated sets of antenna ports and their resources. The UE can then leverage the information to dedicate separate hardware resources for simultaneously receiving at least one reference signal type. The dedicated hardware resources may determine the resource capabilities of the UE.

Depending on the capabilities of the UE, the UE may be able to perform multiple hypothesis or tests on a direction from which the beam is received. This may be performed as part of the beamforming training. The direction may be defined, for example, using the azimuth, and/or elevation of the received beam. Beamforming training and/or refinement of at least one antenna panel during the reception of the reference signal may be performed to determine the optimal direction. In some embodiments, depending on the capabilities associated with its hardware resources, the UE may compute channel estimates for data and/or control channel demodulation or acquire CSI simultaneously with the beamforming training. Simultaneously may mean that the beamforming training and the channel estimation or CSI acquisition occur during the same time.

In certain embodiments, information about the reference signal type for a set of reference signal resource blocks may be signaled to the UE via a dedicated user-specific downlink control channel. User-specific information relating to a quasi-colocation (QCL) of the transmitting antenna ports may be dynamically signaled to the UE to enhance beamforming training and channel estimation. Information included in the reference signal may define the set of antenna ports which are QCIed or non-colocated.

User-specific information may be signaled to the UE. The UE may exploit the user-specific information to enhance the performance of the at least one communication link connecting the UE and at least one network node. In certain embodiments, the UE may use at least one of the reference signal type or information about QCLed and non-colocated antenna ports to configure the channel estimator of the UE and/or the direction of the beamforming receiver at the UE. The determined direction may in some embodiments be used as the initial direction for beamforming training. The direction of beamformer associated with channel estimator, on the other hand, may be kept fixed for the duration of the reception of the demodulation reference signal or CSI acquisition, as shown in the first and second antenna ports of the UE in FIG. 2.

As a result of simultaneous beamforming training and channel estimation or CSI acquisition, the UE may utilize beam or channel reciprocity to obtain at least one UE uplink channel or transmission beam. In certain embodiments, resource spacing of the reference signal may be semi-statically assigned via radio resource control (RRC) signaling to the UE. Resource space may in some embodiments be shared dynamically between UEs. In other embodiments, resources dedicated for the reference signal may be pre-configured in a dynamic manner using physical layer downlink control information (DCI).

Figure 2:
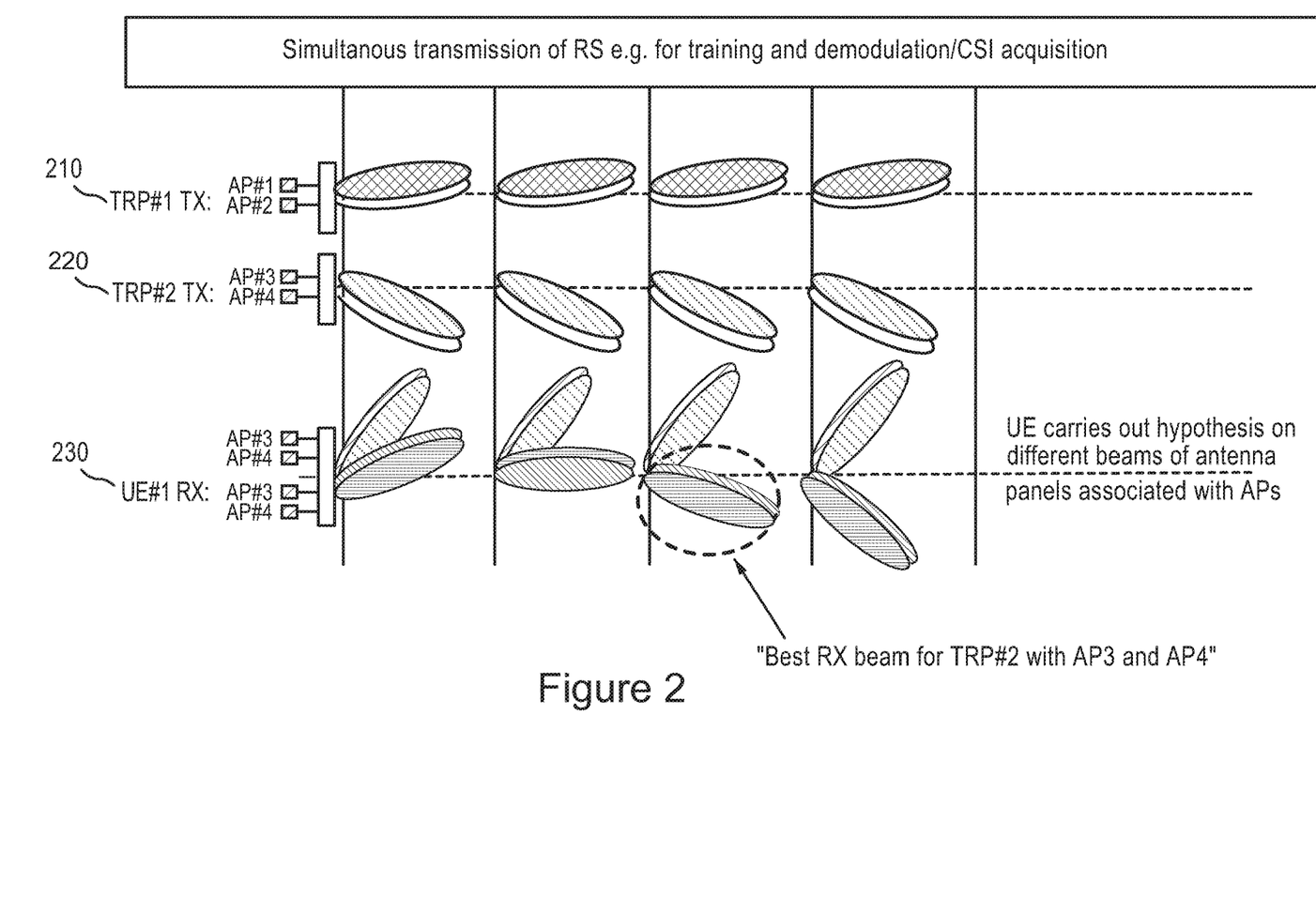
FIG. 2 illustrates a system according to certain embodiments.
Figure 3:
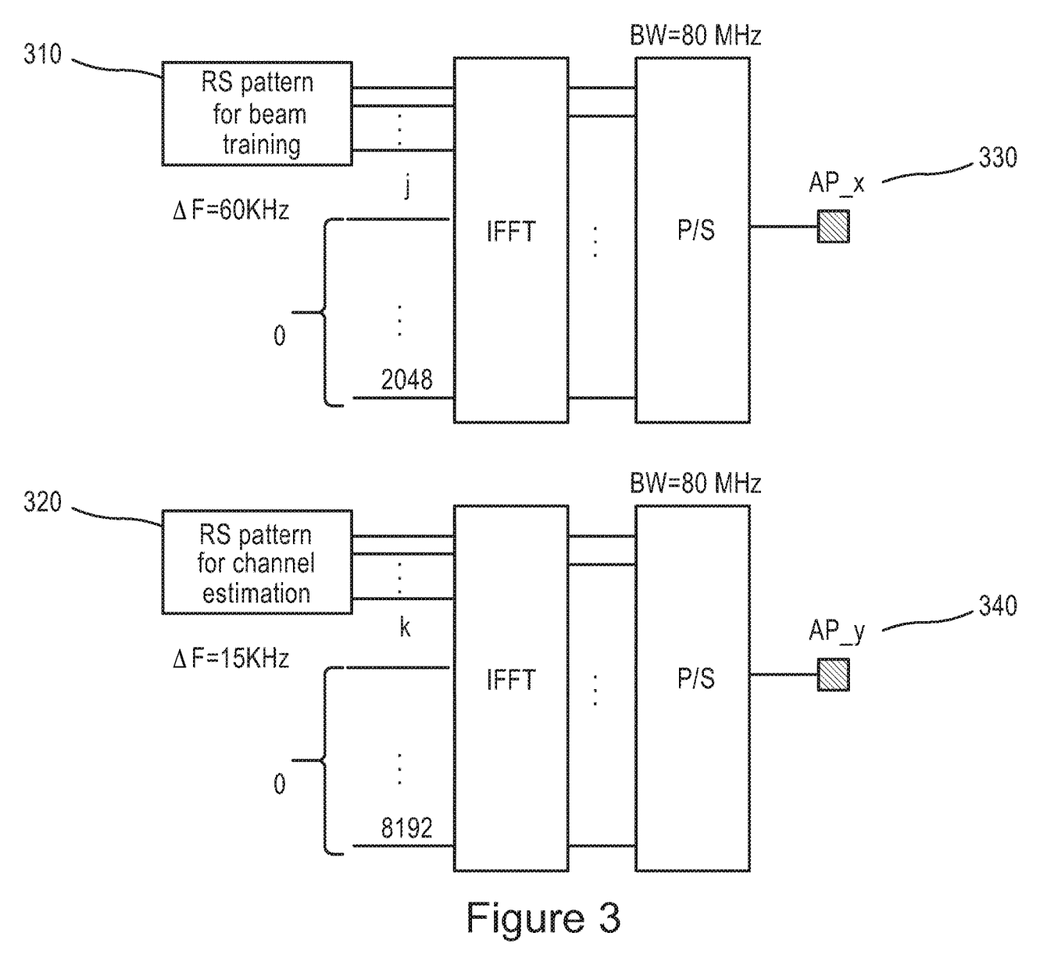
FIG. 3 illustrates a transmitter side process according to certain embodiments.

FIG. 2 illustrates a system according to certain embodiments. Specifically, FIG. 2 illustrates an embodiment of the UE or the receiver side. TRP 210 and TRP 220 are provided, and simultaneously transmit within one OFDM symbol reference signal with different numerologies. In certain embodiments, TRP 210 transmits a reference signal pattern for the computation of channel estimates for data demodulations or CSI acquisition. TRP 220, on the other hand, transmits reference signal pattern for Tx/Rx the beamforming training. Both the reference signal patterns for computation of channel estimates or CSI acquisition and for the beamforming training may be combined into a single reference signal and sent to the UE. FIG. 3 illustrates an embodiment of combining the reference signal patterns on the transmitter side.

Because the sub-carrier spacing of a beam training reference signal may be, for example, four time higher than the demodulation reference signal, four different symbol time instances for beamforming training are observed within the time duration of the demodulation reference signal. In some embodiments, the transmitter beam directions may be kept fixed during transmission of multi-numerology reference signal patterns for demodulation, CSI acquisition, and/or beamforming training. The reference signal may be received by a UE 230 having four different receiver antenna ports (APs). The first and second access points at UE 230 may be fixed or may use the same beam direction while receiving the reference signal, while the third and fourth access points may use different beam directions during each time instance. The third and fourth antenna points may therefore perform beamforming training, while the first and second antenna ports remain fixed.

In some embodiments, each of the APs in UE 230 may be associated with a separate analog beamformer in each AP. A beamformer may be a receiver or a transmitter in a network entity or a UE that receives or transmits a beamforming signal. This may allow the UE to efficiently utilize the multi-purpose reference signal. UE 230 may receive a signal simultaneously from one direction with a receiving beamformer associated with the first and second APs for channel estimation purposes, while also receiving a beamforming training pattern in the third and fourth APs. The UE may then perform beamforming training, and effectively test for the best direction by changing the beam receiving direction of the third and fourth APs.

UE 230 may leverage a received UE specific downlink control signaling received at the UE via DCI, a set of QCL APs, and/or the associated reference signal types of APs, to perform a channel estimation, CSI acquisition, and/or beamforming training. The third time instance in FIG. 2 may represent the best beam receiver direction at UE 230 relative to TRP 220.

FIG. 3 illustrates a transmitter side process according to certain embodiments. Specifically, FIG. 3 shows an example of a transmitter side processing for the transmission of a channel estimation reference signal pattern or CSI acquisition pattern and a beamforming training reference signal pattern with two different numerology options. The two different reference signal patterns may be combined into a single reference signal, which is then sent to the UE.

Transmitter side processing 310 illustrates the transmitter side processing of a reference signal pattern for beamforming training having a sub-carrier spacing of 60 kilohertz (KHz). The sub-carrier spacing may be the numerology of the reference signal pattern. Transmitter side processing 320, on the other hand, illustrates the transmitter side processing of a reference signal pattern for a channel estimation having a sub-carrier spacing of 15 kHz. AP_x 330 and AP_y 340 are also shown, where the x and y defines the antenna port indices. The beamforming training pattern and the pattern for channel estimation may both be included as indices. An Inverse Fast Fourier Transformation (IFFT) may be used to convert the symbols of the reference signal patterns from a frequency to a time domain for transmission. The bandwidth used to create the indices may be 80 megahertz (MHz).

In certain embodiments, when the reference signal pattern mapped on physical resources for beam training and the channel estimation or CSI acquisition reference signal pattern mapped on physical resource elements are combined they do not overlap with each other. In some embodiments, there may be some physical resource element gap, for example a gap of 12 subcarriers, in the frequency domain to ensure isolation between these two different reference signal patterns.

Figure 4B:
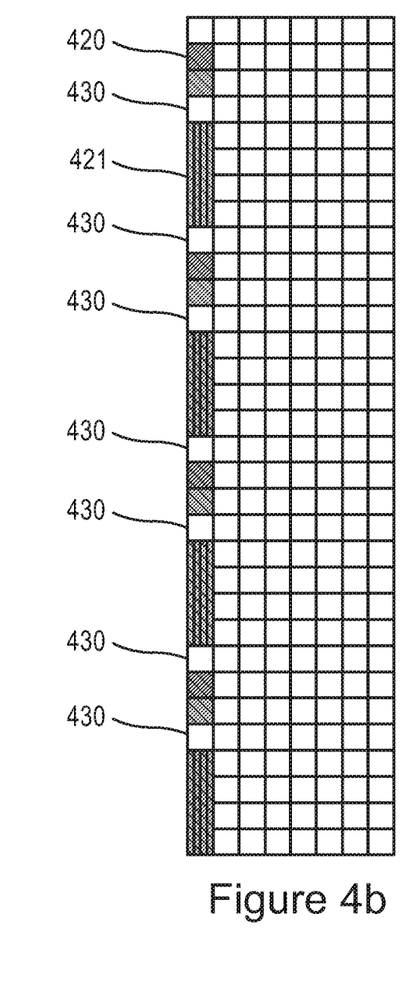
FIG. 4b illustrates a reference signal pattern according to certain embodiments.

FIGS. 4a and 4b illustrate a reference signal pattern according to certain embodiments. Specifically, FIG. 4a illustrates potential multi-purpose reference signal patterns having multiple numerologies for channel estimation for data demodulation or CSI acquisition and for beamforming training. Two numerologies of the reference signal patterns, corresponding to the 60 kHz and 240 kHz subcarrier spacing, may be multiplexed in the frequency domain. Replication reference signal symbol 411 having a 240 kHz subcarrier spacing four times may equal the duration of one reference signal symbol 410 having a 60 kHz subcarrier spacing.

Although FIG. 4a illustrates one reference signal resource pattern, various other forms and embodiments of frequency multiplexing are possible. In the embodiment of FIG. 4a, resource blocks 410 are transmitted from a first AP and a second AP in a TRP for data demodulation. Resource blocks 411 are transmitted from a third AP and a fourth AP in the same or another TRP for beamforming training. The multiple reference signal replicas transmitted with the subcarrier spacing of 240 kHz can allow the UE to perform beamforming training, in which the UE may perform multiple beamforming testing to determine the optimal beam reception direction. The beamforming training may be done at the same time as the UE receives data and/or control information.

FIG. 4b also illustrates a reference signal pattern having resource blocks 420 transmitted from TRP for data demodulation or CSI acquisition, and resource blocks 421 transmitted from TRP for beamforming training. Guard tones 430 may also be placed between the reference signal patterns to avoid possible inter-numerology interference between different numerologies.

Figure 5:
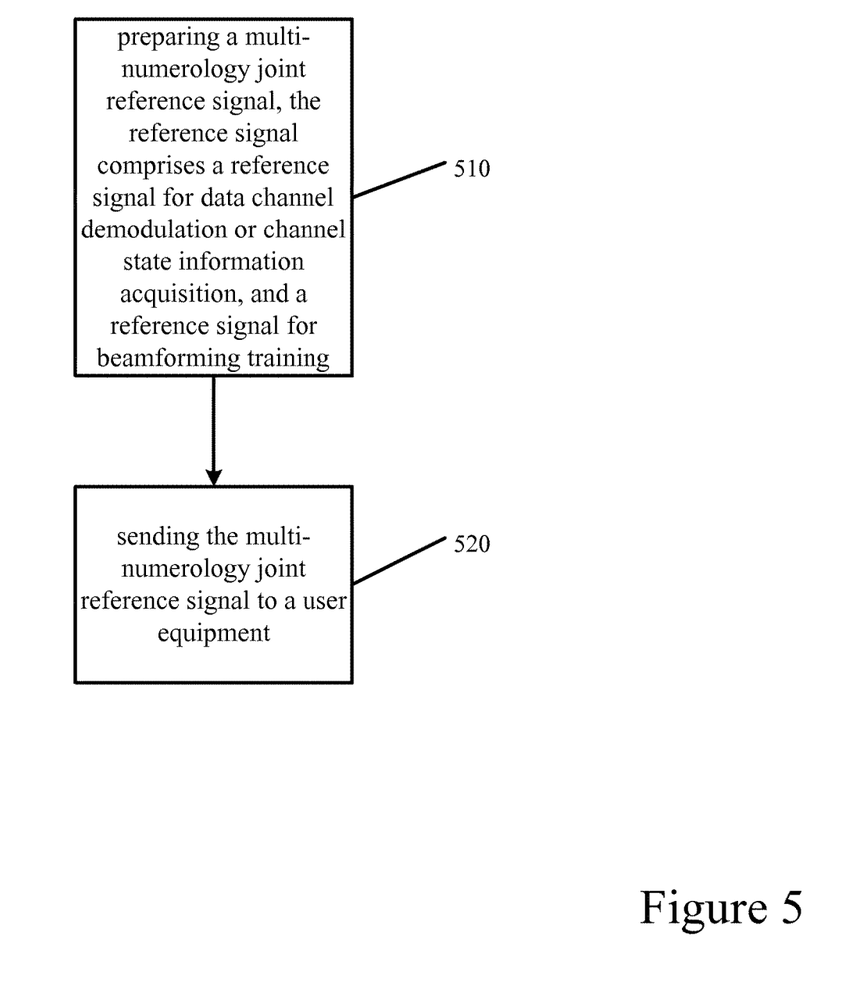
FIG. 5 illustrates a flow diagram according to certain embodiments.

FIG. 5 illustrates a flow diagram according to certain embodiments. Specifically, FIG. 5 illustrates an embodiment of a network node, such as a base station or a 5G-NB. In step 510, the network node may prepare a multi-numerology joint reference signal. The reference signal may include a reference signal for data channel demodulation or channel state information acquisition, and a reference signal for beamforming training. For example, the reference signal may include a beamforming training pattern, a channel estimate pattern, and/or a CSI acquisition pattern. In step 520, the network node may send the multi-numerology joint reference signal to a user equipment. Sending the reference signal may be triggered based on UE feedback, a request received from the UE, or some other triggering condition. The triggering condition may be predetermined or predefined at the network node.

In certain embodiments, the network node may configure or prepare the multiple numerology reference signal, also known as multi-numerology reference signal, on different antenna ports. The network node may transmit one of the numerologies from at least one antenna port and a different numerology from at least one different antenna port. The duration of the symbol with lower numerology, for example 60 kHz, may be equal to the duration of multiple symbols from high numerology, for example 240 kHz. The network node may also insert at least one guard tone between the different numerologies in the reference signal to prevent overlap or inter-numerology interference.

In some embodiments, the network node may multiplex in a code domain the reference signal of the same numerology. Two reference signals having different numerologies may be transmitted in the same time duration. The network node may also precode the reference signal with one or more numerologies intended for data transmission or CSI acquisition. In addition, the network node, in certain embodiments, may switch the numerologies of the reference signal between the antenna ports on a time domain. The network node may then transmit the different numerologies from different transmitter antenna ports associated with beams and antenna panels.

Figure 6:
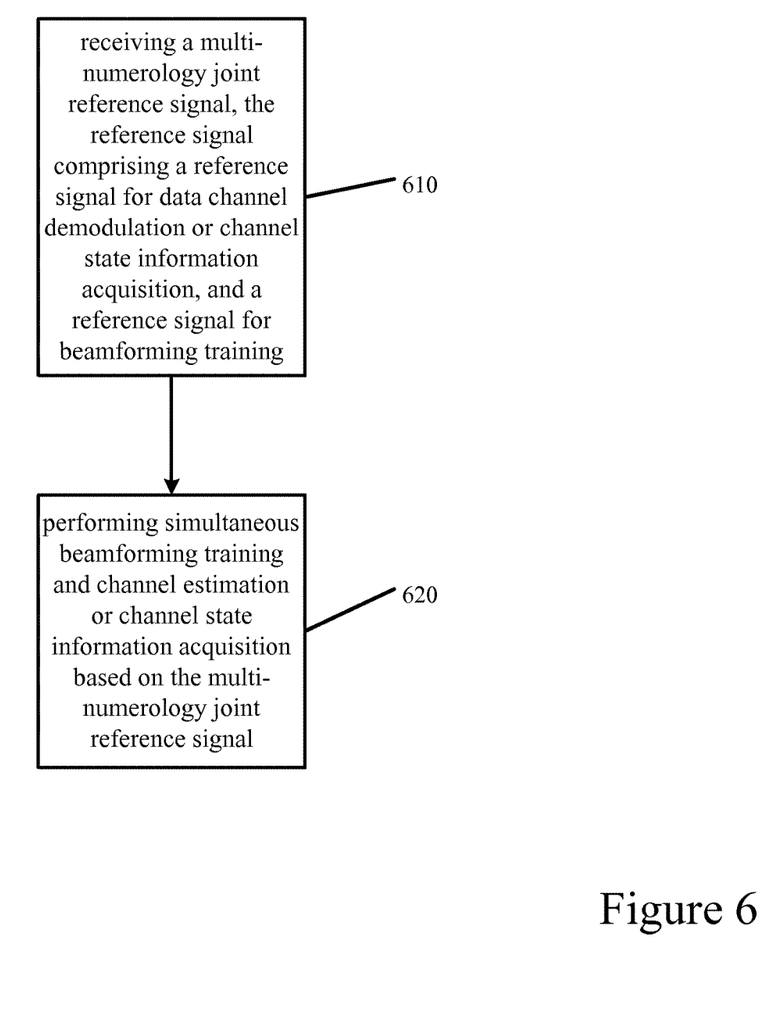
FIG. 6 illustrates a flow diagram according to certain embodiments.

FIG. 6 illustrates a flow diagram according to certain embodiments. Specifically, FIG. 6 illustrates an embodiment of a user equipment. In step 610, the UE may receive a multi-numerology joint reference. The reference signal may include a reference signal for data channel demodulation or channel state information acquisition, and a reference signal for beamforming training. For example, the reference signal may include a beamforming training pattern, or a channel estimation pattern, and/or CSI acquisition pattern. In step 620, the UE may perform simultaneous beamforming training and channel estimation or CSI acquisition based on the multi-numerology joint reference signal.

In certain embodiments, the UE may receive an indication, for example via DCI, that multiple reference signal antenna ports, with different numerologies, are configured or prepared for detection of an incoming signal or beam. The type of reference signal may be indicated to the UE using higher layer signaling. The UE may also receive an explicit or implicit indication that at least one of the numerologies is intended for the UE beamforming training and/or the channel estimation computation. The UE, in certain embodiments, may receive an indication to switch the receiver antennas depending on the transmitted reference numerology and antenna ports.

Figure 7:
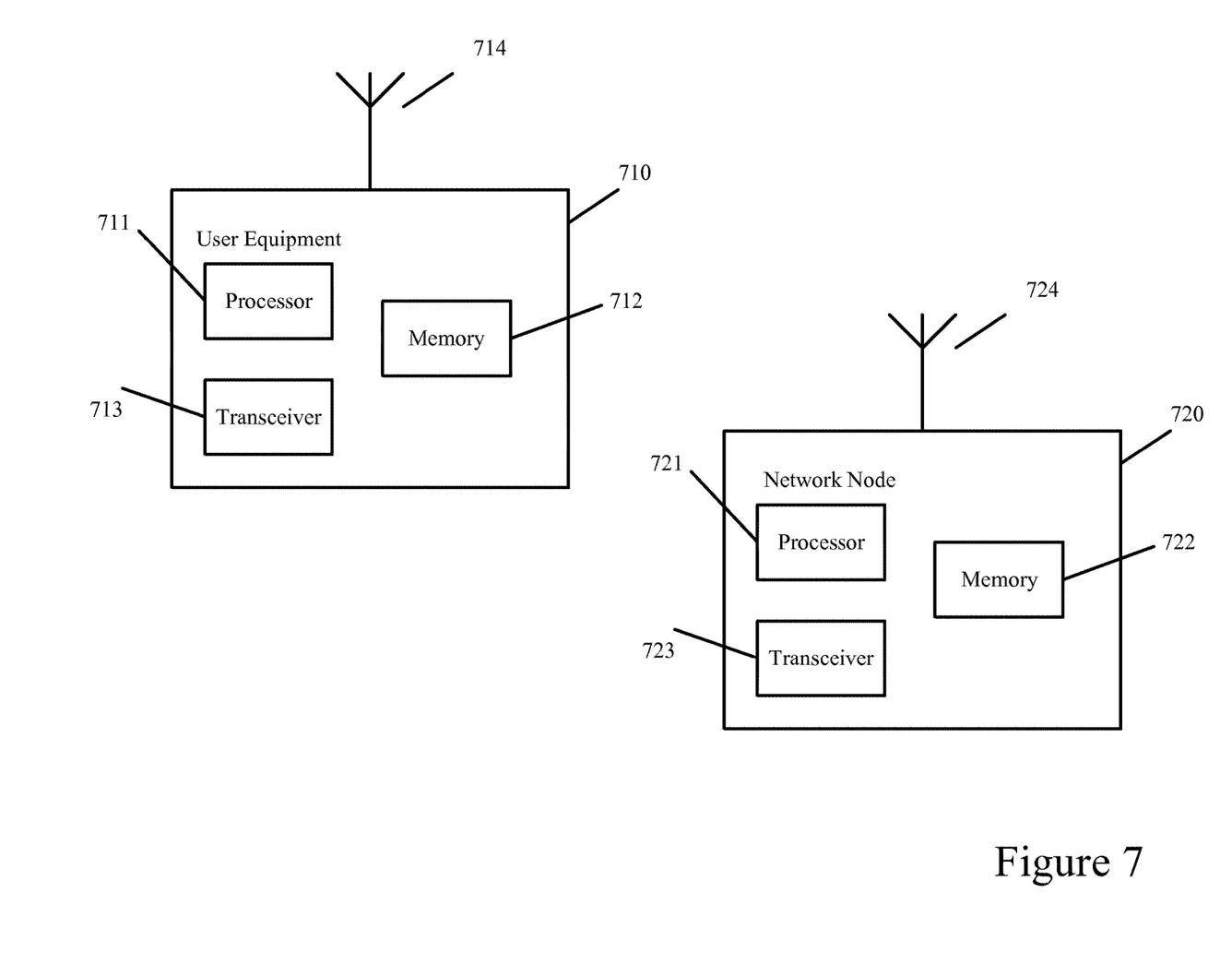
FIG. 7 illustrates a system according to certain embodiments.

FIG. 7 illustrates a system according to certain embodiments. It should be understood that each signal or block in FIGS. 1, 2, 3, 4, 5, and 6 may be implemented by various means or their combinations, such as hardware, software, firmware, one or more processors and/or circuitry. In one embodiment, a system may include several devices, such as, for example, network node 720 or UE 710. The system may include more than one UE 710 and more one network node 720, although only one access node shown for the purposes of illustration. The network node may be an access node, a base station, a 5G-NB, server, host, or any of the other access or network node discussed herein. The network node 720 may include at least one TRP.

Each of these devices may include at least one processor or control unit or module, respectively indicated as 711 and 721. At least one memory may be provided in each device, and indicated as 712 and 722, respectively. The memory may include computer program instructions or computer code contained therein. One or more transceiver 713 and 723 may be provided, and each device may also include an antenna, respectively illustrated as 714 and 724. Although only one antenna each is shown, many antennas and multiple antenna elements may be provided to each of the devices. Higher category UEs generally include multiple antenna panels. Other configurations of these devices, for example, may be provided. For example, network node 720 and UE 710 may be additionally configured for wired communication, in addition to wireless communication, and in such a case antennas 714 and 724 may illustrate any form of communication hardware, without being limited to merely an antenna.

Transceivers 713 and 723 may each, independently, be a transmitter, a receiver, or both a transmitter and a receiver, or a unit or device that may be configured both for transmission and reception. In other embodiments, the UEs or the network node may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server. A beamformer may be a type of transceiver.

A user device or user equipment 710 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiments, an apparatus, such as a network entity, may include means for carrying out embodiments described above in relation to FIGS. 1, 2, 3, 4, 5, and 6. In certain embodiments, at least one memory including computer program code can be configured to, with the at least one processor, cause the apparatus at least to perform any of the processes described herein.

According to certain embodiments, an apparatus 710 may include at least one memory 712 including computer program code, and at least one processor 711. The at least one memory 712 and the computer program code are configured, with the at least one processor 711, to cause the apparatus 710 at least to receive at a user equipment a multi-numerology joint reference signal. The reference signal comprising a reference signal for data channel demodulation or channel state information acquisition, and a reference signal for beamforming training pattern The at least one memory 712 and the computer program code may be configured, with the at least one processor 711, to also cause the apparatus 710 at least to perform simultaneous beamforming training and channel estimation or channel state information acquisition based on the multi-numerology joint reference signal.

According to certain embodiments, an apparatus 720 may include at least one memory 722 including computer program code, and at least one processor 721. The at least one memory 722 and the computer program code are configured, with the at least one processor 721, to cause the apparatus 720 at least to prepare at the network node a multi-numerology joint reference signal. The reference signal comprises a reference signal for data channel demodulation or channel state information acquisition, and a reference signal for beamforming training. The at least one memory 722 and the computer program code may be configured, with the at least one processor 721, to also cause the apparatus 720 at least to send the multi-numerology joint reference signal to a user equipment.

Processors 711 and 721 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 712 and 722 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 720 or UE 710, to perform any of the processes described above (see, for example, FIGS. 1, 2, 3, 4, 5, and 6). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 7 illustrates a system including a network node 720 and UE 710, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 710 may likewise be provided with a variety of configurations for communication other than communication network node 720. For example, the UE 710 may be configured for device-to-device, machine to machine, or vehicle-to-vehicle communication.

Certain embodiments can allow UEs equipped with multiple antenna panels to operate without causing a significant amount of overhead and latency for the system. The above embodiments can reduce overhead and latency by simultaneously performing beamforming training and channel estimation or acquisition of CSI by using a multi-numerology reference signal. Different numerologies, such as sub-carrier spacing, can be multiplexed in frequency on the reference signal. The joint multi-numerology reference signal may avert the need for scheduling separate training signals.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary

3GPP Third Generation Partnership Project
BRS beam reference signal
BRRS beam refinement reference signal
CSI Channel State Information
CQI Channel Quality Indication
DCI downlink control information
DMRS demodulation reference signal
PMI Precoder Matrix Indicator
RSRP reference signal received power
RI Rank Indicator
RX receiver
RS reference signals
TX transmitter
TXRU transmitter and receiver units
QCL quasi-colocation
UE user equipment According to a first embodiment, a method may include receiving at a user equipment a multi-numerology joint reference signal. The reference signal comprises a reference signal for data channel demodulation or channel state information acquisition, and a reference signal for beamforming training. The method may also include performing simultaneous beamforming training and channel estimation or channel state information acquisition based on the multi-numerology joint reference signal.

In a variant, the user equipment may receive an indication that multiple antenna ports are set to detect a multi-numerology reference signal.

In another variant, the user equipment may receive an indication that a first numerology in the multi-numerology reference signal is intended for beamforming training, and a second numerology in the multi-numerology reference signal is intended for channel estimation or channel state information acquisition.

In yet another variant, the channel estimation may include an estimation of at least a reference signal received power or a reference signal received quality.

In yet another variant, the CSI acquisition may include a computation rank indicator (RI), precoder matrix indicator (PMI), and channel quality information (CQI).

In some variants, at least one guard tone may be included in the reference signal. The guard tone may be placed between a first numerology and second numerology of the multi-numerology reference signal.

In a further variant, a first numerology and a second numerology of the multi-numerology reference signal may be multiplexed in a code domain or a frequency domain.

In a variant, the user equipment may receive an indication to switch to an antenna port depending on at least one of the numerologies in the reference signal.

In another variant, a first numerology and a second numerology of the multi-numerology reference signal may have different sub-carrier spacing.

According to a second embodiment, a method may include preparing at the network node a multi-numerology joint reference signal. The reference signal comprises a reference signal for data channel demodulation or channel state information acquisition, and a reference signal for beamforming training. The method may also include sending the multi-numerology joint reference signal to a user equipment.

In a variant, the sending of the multi-numerology joint reference signal may be triggered by at least one of receiving feedback or a request from a user equipment or a predetermined triggering condition at the network node.

In another variant, the beamforming training pattern and information relating to demodulation of the data channel or channel state information acquisition may be simultaneously transmitted within a single orthogonal frequency-division multiplexing symbol.

In an additional variant, the multi-numerology reference signal is prepared on different antenna ports of the network node.

In another variant, a first numerology of the reference signal and a second numerology of the reference signal may be transmitted on different antenna ports of the network node.

In some variants, at least one guard tone may be inserted in the reference signal. The guard tone may be placed between a first numerology and second numerology of the multi-numerology reference signal.

In a further variant, a first numerology and a second numerology of the multi-numerology reference signal may be multiplexed in a code domain or a frequency domain.

In a variant, a first numerology and a second numerology of the multi-numerology reference signal may be transmitted during the same time duration.

In another variant, at least one of the numerologies in the multi-numerology reference signal may be intended for data transmission.

According to a third and a fourth embodiment, an apparatus can include at least one processor and at least one memory and computer program code. The at least one memory and the computer program code can be configured to, with the at least one processor, cause the apparatus at least to perform the method according to the first and second embodiments respectively, and any of their variants.

According a fifth and a sixth embodiment, an apparatus can include means for performing the method according to the first and second embodiments respectively, and any of their variant.

According to a seventh and an eighth embodiment, a computer program product may encode instructions for performing a process including the method according to the first and second embodiments respectively, and any of their variants.

According to a ninth and a tenth embodiment, a non-transitory computer-readable medium may encode instructions that, when executed in hardware, perform a process including the method according to the first and second embodiments respectively, and any of their variants.

The invention claimed is:

1. An apparatus comprising:
   at least one processor; and
   at least one memory including computer program code,
   wherein the at least one memory and the computer program code are configured to, with the at least one processor, cause the apparatus at least to:
   receive a multi-purpose reference signal, wherein the multi-purpose reference signal comprises a reference signal for data channel demodulation or channel state information acquisition, and a reference signal for beamforming training; and
   perform simultaneous beamforming training and channel estimation or channel state information acquisition based on the multi-purpose reference signal,
   wherein the reference signal for data channel demodulation or channel state information acquisition comprises a first numerology, and the reference signal for beamforming training comprises a second numerology.

2. The apparatus according to claim 1, wherein the at least one memory and the computer program code are further configured to, with the at least one processor, cause the apparatus to:
   receive an indication that multiple antenna ports are set.

3. The apparatus according to claim 1, wherein the channel estimation comprises an estimation of at least a reference signal received power or a reference signal received quality.

4. The apparatus according to claim 1, wherein the channel state information acquisition comprises a computation rank indicator, precoder matrix indicator, and channel quality information.

5. The apparatus according to claim 1, wherein the at least one memory and the computer program code are further configured to, with the at least one processor, cause the apparatus to:
   utilize beam or channel reciprocity to obtain at least one user equipment uplink channel or transmission beam.

6. The apparatus according to claim 1, wherein the first numerology and the second numerology of the multi-purpose reference signal may be multiplexed in a code domain or a frequency domain.

7. The apparatus according to claim 1, wherein the at least one memory and the computer program code are further configured to, with the at least one processor, cause the apparatus to:
   receive an indication to switch to an antenna port depending on at least one of the numerologies in the multi-purpose reference signal.

8. The apparatus according to claim 1, wherein the first numerology and the second numerology of the multi-purpose reference signal have a same or different sub-carrier spacing.

9. The apparatus according to claim 1, wherein the simultaneous beamforming training and channel estimation or channel state information acquisition triggers an adjustment of a beam direction of at least one of a transmitter or a receiver at the apparatus.

10. An apparatus comprising:
    at least one processor; and
    at least one memory including computer program code,
    wherein the at least one memory and the computer program code are configured to, with the at least one processor, cause the apparatus at least to:
    prepare at a network node a multi-purpose reference signal, wherein the multi-purpose reference signal comprises a reference signal for data channel demodulation or channel state information acquisition, and a reference signal for beamforming training; and
    send the multi-purpose reference signal to a user equipment,
    wherein the reference signal for data channel demodulation or channel state information acquisition comprises a first numerology, and the reference signal for beamforming training comprises a second numerology.

11. The apparatus according to claim 10, wherein the sending of the multi-purpose reference signal is triggered by at least one of receiving a feedback or a request from the user equipment or a predetermined triggering condition at the network node.

12. The apparatus according to claim 10, wherein the reference signal for beamforming training and the reference signal for data channel demodulation or channel state information acquisition are simultaneously transmitted within a single orthogonal frequency-division multiplexing symbol.

13. The apparatus according to claim 10, wherein the multi-purpose reference signal is prepared on different antenna ports of the network node.

14. The apparatus according to claim 10, wherein the first numerology and the second numerology of the multi-purpose reference signal may be transmitted on different antenna ports of the network node.

15. The apparatus according to claim 10, wherein the first numerology and the second numerology of the multi-purpose reference signal are multiplexed in a code domain or a frequency domain.

16. The apparatus according to claim 10, wherein the first numerology and the second numerology of the multi-purpose reference signal are transmitted during the same time duration.

17. The apparatus according to claim 10, wherein the first numerology and the second numerology of the multi-purpose reference signal have a same or different sub-carrier spacing.

18. The apparatus according to claim 10, wherein the multi-purpose reference signal triggers an adjustment of a beam direction of at least one of a transmitter or a receiver at the user equipment.

19. An apparatus comprising:
at least one processor; and
at least one memory including computer program code,
wherein the at least one memory and the computer program code are configured to, with the at least one processor, cause the apparatus at least to:
receive a multi-purpose reference signal, wherein the multi-purpose reference signal comprises a reference signal for data channel demodulation or channel state information acquisition, and a reference signal for beamforming training; and
perform simultaneous beamforming training and channel estimation or channel state information acquisition based on the multi-purpose reference signal,
wherein the simultaneous beamforming training and channel estimation or channel state information acquisition triggers an adjustment of a beam direction of at least one of a transmitter or a receiver at the apparatus.

* * * * *